US007995965B2

(12) United States Patent
Wuidart

(10) Patent No.: US 7,995,965 B2

(45) Date of Patent: Aug. 9, 2011

(54) ADAPTABLE POWER SUPPLY CIRCUIT

(75) Inventor: Luc Wuidart, Pourrieres (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 12/553,999

(22) Filed: Sep. 4, 2009

(65) Prior Publication Data

US 2009/0323381 A1 Dec. 31, 2009

Related U.S. Application Data

(63) Continuation of application No. 11/180,166, filed on Jul. 13, 2005, now Pat. No. 7,606,532.

(30) Foreign Application Priority Data

Jul. 13, 2004 (FR) ..................................... 04 51511

(51) Int. Cl.
*H04B 7/00* (2006.01)

(52) U.S. Cl. ....................... 455/41.1; 455/41.2; 455/572

(58) Field of Classification Search ................ 455/41.1, 455/41.2, 572, 127.1, 343.1, 39, 41.3
See application file for complete search history.

(56) References Cited

U.S. PATENT DOCUMENTS

| | | | | |
|---|---|---|---|---|
| 4,222,096 | A | 9/1980 | Capewell | |
| 4,432,034 | A * | 2/1984 | Wohlert et al. | 361/154 |
| 5,828,562 | A * | 10/1998 | Rivet | 363/125 |
| 6,604,055 | B1 | 8/2003 | Burkett et al. | |
| 6,664,817 | B2 | 12/2003 | Nakata et al. | |
| 7,161,307 | B2 | 1/2007 | Chen | |
| 7,183,839 | B2 | 2/2007 | Saito | |
| 7,308,249 | B2 | 12/2007 | Rizzo et al. | |
| 7,423,887 | B2 * | 9/2008 | Yasumura | 363/21.02 |
| 2004/0104809 | A1 | 6/2004 | Rizzo et al. | |
| 2006/0034109 | A1 | 2/2006 | Benabdelaziz et al. | |

OTHER PUBLICATIONS

French Search Report dated Feb. 24, 2005from related French Patent Application No. 04/51511, filed Jul. 13, 2004.

* cited by examiner

*Primary Examiner* — Sonny Trinh
(74) *Attorney, Agent, or Firm* — Lisa K. Jorgenson; James H. Morris; Wolf, Greenfield & Sacks, P.C.

(57) ABSTRACT

A power supply circuit and a transponder having a circuit for rectifying an A.C. voltage and two power storage elements, the rectifying circuit providing a rectified voltage to at least one of the storage elements and an output voltage being provided by at least one of the storage elements, and at least one switching element for switching the circuit operation between a state of provision of a relatively high voltage and a state of provision of a relatively low voltage, the second state configuring the rectifying circuit in halfwave operation.

10 Claims, 2 Drawing Sheets

ADAPTABLE POWER SUPPLY CIRCUIT

CROSS REFERENCE TO RELATED APPLICATIONS

This application is a continuation of U.S. application Ser. No. 11/180,166 filed Jul. 13, 2005 entitled "Adaptable Power Supply Circuit" which application claims the priority benefit of French patent application number 04/51511, filed on Jul. 13, 2004, entitled "Adaptable Power Supply Circuit," which are hereby incorporated by reference to the maximum extent allowable by law.

BACKGROUND OF THE INVENTION

1. Field of the Invention

The present invention relates to the field of power supply circuits extracting their power from an A.C. voltage source having a dynamically-varying amplitude. The present invention applies to systems supplied by a fixed voltage source as well as to mobile systems recovering their power from a source remotely transmitting power, and thus a variable voltage.

An example of application of the present invention relates to remotely supplied transponders which extract the power necessary to their operation from the electromagnetic field radiated by an antenna of a read/write terminal in the vicinity of which they are present. Electromagnetic transponders are based on the use of a parallel LC-type oscillating circuit, across which an A.C. voltage having an amplitude varying according to the distance between the transponder and the terminal is generated.

2. Discussion of the Related Art

FIG. 1 very schematically illustrates in the form of blocks a terminal 1 for reading electromagnetic transponders and a conventional transponder 10 intended to communicate with this terminal.

On the read terminal side, a series oscillating circuit 2 formed of an inductance L1 forming an antenna can generally be found, in series with a capacitor C1 connected between an output terminal 3 of an amplifier or antenna coupler (not shown) and a reference terminal 4 (generally the ground). The antenna coupler belongs to one or several circuits 5 (LECT) for controlling the oscillating circuit and exploiting the received data and comprises, among others, a modulator-demodulator and a microprocessor for processing the control and data signals.

Circuit 5 of the terminal generally communicates with different input/output circuits (keyboard, screen, means of transmission to a central server, etc.) and/or processing circuits not shown. These circuits extract the power necessary to their operation from a power supply circuit (not shown) connected, for example, to the electric system or to a battery.

On the side of transponder 10, an inductance L2, in parallel with a capacitor C2, forms a parallel oscillating circuit (called a resonant circuit), intended to sense the electromagnetic field generated by the series oscillating circuit (L1, C1) of terminal 1. The resonant circuit (L2, C2) of transponder 10 is tuned to the frequency of a carrier of excitation of the oscillating circuit (L1, C1) of terminal 1.

Terminals 11, 12 of the resonant circuit (L2, C2), corresponding to the terminals of capacitor C2, are connected to two A.C. input terminals of a rectifying circuit 13 formed of a bridge of four diodes D1, D2, D3, and D4 of full-wave rectification type. The A.C. input terminals are formed by the midpoints of the branches formed by respective series associations of diodes (D1, D3) and of diodes (D2, D4).

In a first transponder type (not shown), a capacitor is connected to output terminals 14 and 15 of circuit 13 to store the power and smooth the rectified voltage.

In a second transponder type such as shown in FIG. 1, it is provided to increase the range by allowing a voltage doubler operation. A series association of two capacitors C3 and C4 is then connected to rectified output terminal 14 and 15 (GND) of circuit 13. Terminal 15 forms the ground of transponder 10.

When transponder 10 enters the electromagnetic field of terminal 1, a high-frequency A.C. voltage VE is generated across the resonant circuit (L2, C2). This voltage, rectified by circuit 13 and smoothed by capacitors C3 and C4, becomes a voltage VS on terminal 14. Voltage VS is applied to the input of a regulator 19 (REG) having the function of providing a regulated voltage VR to a circuit 20 (CTL). Circuit 20 essentially comprises a microprocessor and a memory (not shown).

The junction point of diodes (D2, D4) is connected to a first terminal 17 of a selector (SEL) having a second terminal connected to ground GND. Terminal 14 is connected to a first input of a comparator 18 (COMP) having a second input receiving a voltage threshold VSLIM. Selector SEL switches a terminal 16 connected to the junction point of capacitors C3 and C4 on one or the other of terminals 15 and 17. The output of comparator 18 controls selector SEL according to voltage VS with respect to threshold VSLIM.

In the example of FIG. 1, voltage VE recovered between terminals 11, 12 of the transponder in the field of terminals 1 depends on the distance which separates the transponder from the terminal and on the coupling between the respective oscillating circuits of the terminal and of the transponder. To have a system with a relatively large range (on the order of from 20 to 50 centimeters), it must be switched from a fullwave rectification at short distance to a voltage doubler rectification when the transponder is distant from the terminal. The rectification mode switches when voltage VS reaches threshold VSLIM. Voltage VSLIM represents the minimum supply voltage of circuits 19 and 20. Threshold VSLIM also corresponds to the maximum distance between terminal 1 and transponder 10 from which the remotely supplied power provided to the transponder becomes insufficient to supply circuits 19 and 20.

When transponder 10 is close to terminal 1, voltage VS is greater than threshold VSLIM. The output of comparator 18 connects terminal 16 of selector SEL to terminal 15, thus short-circuiting capacitor C4. Circuit 13 operates in fullwave rectification. Diode pairs (D1, D4) and (D2, D3) are alternately turned on at the frequency of voltage VE. Only capacitor C3 stores the power and is charged to voltage VS with a frequency which is twice that of A.C. voltage VE. Voltage VS is on average equal to once rectified input voltage VE.

As transponder 10 is moved away from terminal 1, voltage VS becomes smaller than voltage VSLIM. The output of comparator 18 switches terminal 16 of selector SEL to terminal 17. This switching configures circuit 13 in voltage doubler rectification mode. Only diodes D1 and D3 are alternately turned on at the frequency of voltage VE. The power is alternately stored in each of capacitors C3 and C4. The voltage present across each capacitor C3 and C4 is in average equal to once rectified input voltage VE. Voltage VS is then equal, in average, to twice rectified input voltage VE. A disadvantage is that, when a transponder is closer to the terminal, in fullwave rectification, it receives too high a power as compared to its needs.

A problem which is then posed when the oscillating circuits of the terminal and of the transponder are very close to each other is that, if they are tuned, the power transmitted from the terminal to the transponder is such that said transponder heats up. This thermal effect may have as a consequence a deformation of the plastic card containing the transponder.

More generally, a disadvantage of systems supplied by A.C. voltage sources with a very high dynamic variation is that they modify the amplitude of the rectified voltage without adapting the power storage frequency to the needs of the load, formed by the transponder in the case of FIG. 1.

Another disadvantage of the system of FIG. 1 is that it requires means of protection against overcharges, compatible with a storage resulting from a fullwave rectification, and which often are of dissipative nature.

SUMMARY OF THE INVENTION

The present invention aims at providing a novel solution which overcomes the disadvantages of conventional solutions, especially in the case of systems supplied by A.C. voltage sources with a dynamic variation.

The present invention also aims, in the case of transponders, at reducing the storage of the power remotely supplied at short distance from the read/write terminal.

The present invention further aims at providing a solution which is particularly simple to implement.

To achieve these and other objects, the present invention provides a power supply circuit comprising a circuit for rectifying an A.C. voltage and two power storage elements, the rectifying circuit providing a rectified voltage to at least one of the storage elements and an output voltage being provided by at least one of the storage elements, and at least one switching element for switching the circuit operation between a state of provision of a relatively high voltage and a state of provision of a relatively low voltage, the second state configuring the rectifying circuit in halfwave operation.

According to an embodiment of the present invention, the switching element short-circuits one of the storage elements.

According to an embodiment of the present invention, the rectifying circuit and the storage elements are respectively formed of series associations of two diodes and of two capacitors, the A.C. voltage being applied to the respective midpoints of said series associations connected in parallel.

According to an embodiment of the present invention, the capacitors are of same value.

According to an embodiment of the present invention, the power supply circuit further comprises a comparator of data representative of the dissipation in the supplied load with respect to a threshold.

According to an embodiment of the present invention, said comparator compares the output voltage with a predetermined threshold, greater than the maximum that can be reached by said relatively high voltage.

According to an embodiment of the present invention, the threshold is settable.

The present invention also provides a transponder comprising:

a resonant circuit providing a variable voltage from an electromagnetic circuit radiated by a terminal; and a power supply circuit providing an output voltage.

According to an embodiment of the present invention, said relatively high voltage is selected to be greater than the minimum operation voltage at the range limit.

The foregoing objects, features, and advantages of the present invention will be discussed in detail in the following non-limiting description of specific embodiments in connection with the accompanying drawings.

DETAILED DESCRIPTION

Figure 1:
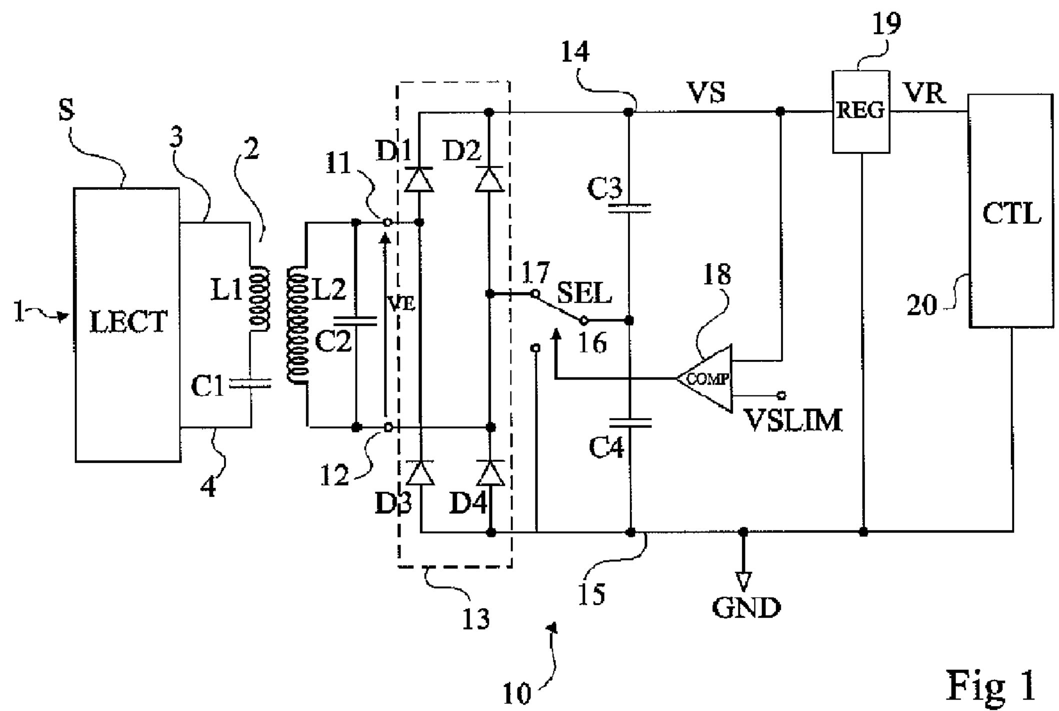
FIG. 1, previously described, is intended to show the state of the art and the problem to solve.

The same elements have been designated with the same reference numerals in the different drawings. For clarity, only those elements necessary to the understanding of the present invention have been shown in the drawings and will be described hereafter.

A feature of the present invention is to reduce the power stored from an A.C. rectified voltage source when it exceeds the load needs, without using a specific dissipation system.

Figure 2:
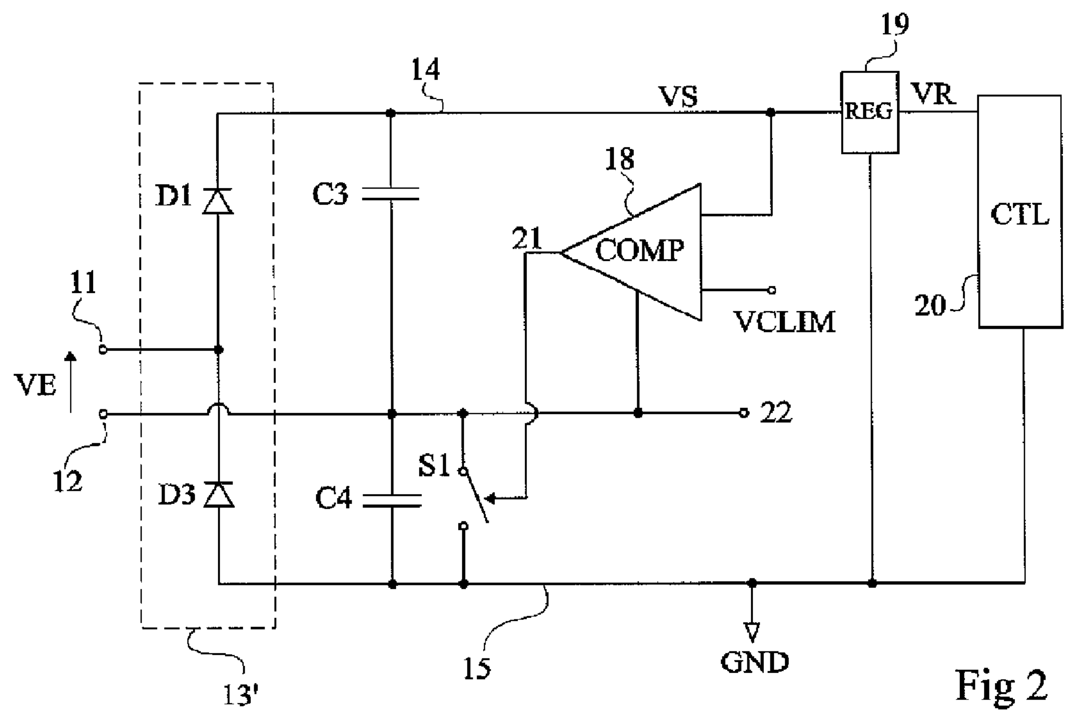
FIG. 2 very schematically shows a first embodiment of the circuit for rectifying and regulating the stored power according to the present invention.

FIG. 2 schematically shows an embodiment of a circuit for rectifying and regulating the power stored from a dynamically-variable voltage source. The example of FIG. 2 will be described in relation with an application to electromagnetic transponders having their A.C. voltages dynamically varying according to the distance between the transponder and the terminal.

In this example, when transponder 10 (FIG. 1) enters the electromagnetic field of terminal 1, a high-frequency A.C. voltage VE is generated between terminals 11 and 12 of resonant circuit (L2, C2). A rectifying circuit 13' formed by a series association of two diodes D1 and D3 is in parallel with two capacitors C3 and C4 in series, which connect the cathode of diode D1 to the anode of diode D3. Input terminals 11 and 12 are formed by respective junction points of diodes D1 and D3 and of capacitors C3 and C4. A.C. voltage VE, rectified by diodes D1 and D3 and smoothed by capacitors C3 and C4, becomes a voltage VS between a terminal 14 corresponding to the cathode of diode D1 and a terminal 15 corresponding to the anode of diode D3. Voltage VS is applied to a first terminal of a comparator 18 (COMP), having a second terminal receiving a voltage threshold (VCLIM). Output 21 of comparator 18 controls a switch S1, having its terminals connecting junction point 22 (here, confounded with terminal 12) of capacitors C3 and C4 to ground 15. Voltage VS is applied to an input of a regulator 19 (REG) having an output providing a voltage VR to a circuit 20 (CTL). As previously, circuits 19 and 20 are also connected to ground 15 of the transponder.

The comparison between voltages VS and VCLIM is referenced with respect to the voltage present on terminal 22. This amounts to comparing the voltage between terminals 14, 22 of capacitor C3 with threshold VCLIM.

When transponder 10 (FIG. 1) is far from terminal 1, the voltage across capacitor C3 is smaller than threshold VCLIM, output 21 controls the turning-off of switch S1. Only diodes D1 and D3 are alternately turned on at the frequency of voltage VE. The power is alternately stored in each of capacitors C3 and C4. The voltage present across each capacitor C3 or C4 is in average equal to once rectified input voltage VE. Voltage VS is equal, in average, to twice rectified input voltage VE. Circuit 13' then operates in voltage doubler mode. Storage elements C3 and C4 are generally sized to maximize the remote-supply distance of transponder 10 in voltage doubler rectification.

When transponder 10 is close to terminal 1, the voltage across capacitor C3 is greater than or equal to threshold VCLIM, and output 21 controls the turning on of switch S1, connecting terminal 22 to ground 15. Switch S1 then short-circuits capacitor C4. Only diode D1 is turned on at half the frequency of voltage VE. The power is stored in the sole capacitor C3 at the rate of one halfwave out of two of voltage VE. The voltage present across C3 is in average equal to once rectified input voltage VE, minus the voltage drop resulting from the power consumption of circuits 19 and 20 during the halfwaves of voltage VE where diode D1 is not on. Voltage VS is equal, in average, to less than once rectified input voltage VE. Circuit 13' is then configured in halfwave rectification.

As transponder 10 (FIG. 1) is brought closer to terminal 1, voltage VS reaches threshold VCLIM. Switch S1 is turned on, configuring rectifying circuit 13' in halfwave rectification. Capacitor C3 is then the only one to be recharged at the rate of half the frequency of voltage VE and at a voltage smaller than once VE. The power stored in capacitor C3 is then decreased by at least a factor two with respect to a fullwave rectification mode.

Threshold VCLIM is selected to be at a voltage beyond which the power stored in doubling mode in capacitors C3 and C4 becomes such that is causes an overheating by dissipation in transponder 10.

As an alternative, it may be provided to replace the measurement of voltage VS at terminal 14 by a temperature measurement, threshold VCLIM then corresponding to a maximum temperature threshold not to be exceeded.

It may also be provided to vary voltage threshold VCLIM according to a control signal provided, for example, by circuit 20. Threshold VCLIM may also be obtained in digital fashion.

In the example of FIG. 2, capacitors C3 and C4 are preferably selected to be identical. However, it may be provided to select capacitors C3 and C4 of different values. The series association of capacitors C3 and C4 then forms a divider of voltage VS. This results in generating different voltages across each of capacitors C3 and C4 to, for example, provide different supply voltages for the needs of circuits 20.

According to a variation of the present invention, switch S1 is connected in parallel on capacitor C3, and comparator 18 is placed between terminal 22 and ground 15. Comparator 18 then compares the voltage present on terminal 22 with threshold VCLIM. In this case, only capacitor C4 stores the power in halfwave rectification.

Figure 3:
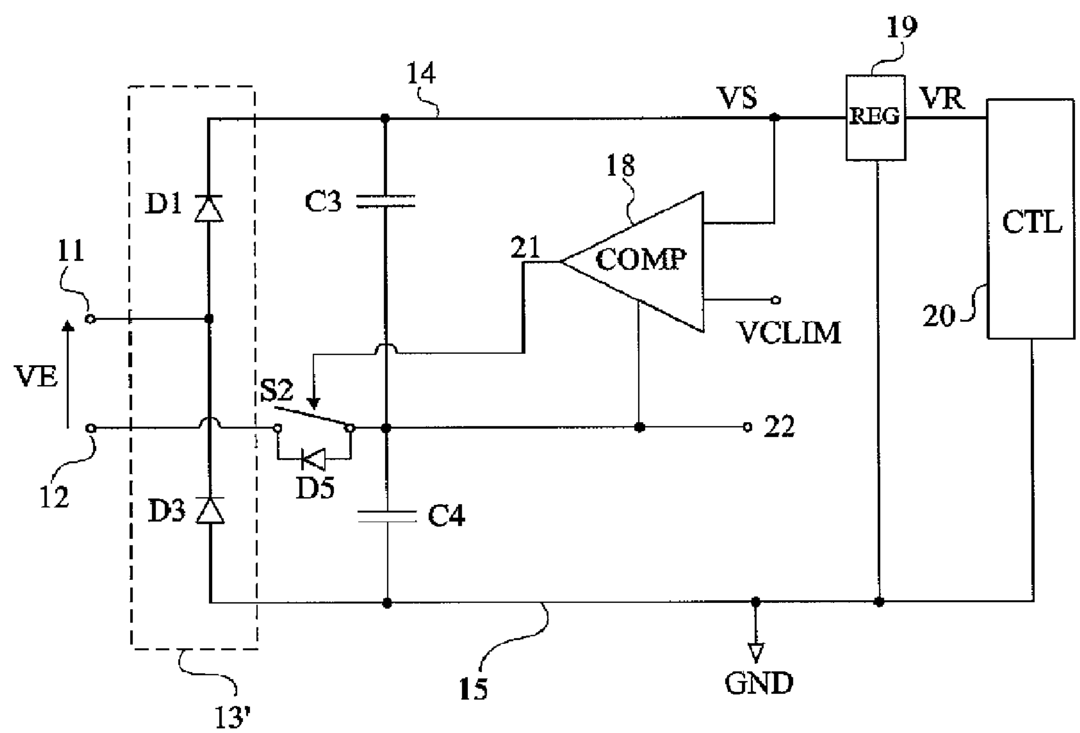
FIG. 3 very schematically shows a second embodiment of the circuit for rectifying and regulating the stored power according to the present invention.

FIG. 3 very schematically shows a second embodiment of the circuit for rectifying and regulating the power stored from a dynamically-variable voltage source. Only the differences with respect to the first embodiment of FIG. 2 will be described.

In the example of FIG. 3, switch S1 (FIG. 2) is replaced with a switch S2 between terminals 12 and 22. The control terminal of switch S2 is connected to output 21 of comparator 18. In parallel with switch S2, a diode D5 is connected to terminal 12 by its cathode, and to terminal 22 by its anode.

Conversely to the example of FIG. 2, as long as voltage VS is smaller than voltage VCLIM, switch S2 is maintained on by output 21 of comparator 18. Circuit 13' is then configured in voltage doubler rectification mode.

When transponder 10 (FIG. 1) comes closer to terminal 1 and voltage VS is equal to threshold VCLIM, output 21 controls the turning-off of switch S2. Diodes D1 and D5 are then on. Only capacitor C3 stores the power at half the frequency of voltage VE. As described in FIG. 2, voltage VS is equal, in average, to less than once rectified input voltage VE. Circuit 13' is then configured in halfwave rectification, decreasing the power stored in capacitor C3 by at least a factor two with respect to a fullwave rectification mode. Preferably, switch S2 is formed by an N-type (or P-type) MOS transistor having its parasitic diode forming diode D5. MOS transistor gate control techniques are well known by those skilled in the art and here pose no specific problem.

As an alternative, it may also be provided to reverse the direction of conduction of diode D5 by connecting its anode to terminal 12 and its cathode to terminal 22. When voltage VS is equal to VCLIM, the switch is off and diodes D3 and D5 are then on. Only capacitor C4 stores the power, according to the same principle as that described in FIG. 3.

An advantage of the present invention is that it adapts the power stored in the storage elements to the needs of the load of a power supply circuit having a dynamically-varying voltage source.

Another advantage of the present invention is that it reduces the power stored from an alternately rectified voltage source when it exceeds the needs of the load, without using a specific dissipation system.

Another advantage of the present invention is that it avoids an overheating of the transponder when it is in close coupling with the terminal.

The present invention enables increasing the sensitivity of the reader in close coupling, while decreasing the risk of saturation of the reader demodulator consecutive to too high a rectified voltage of the transponder.

Although the present invention has been described in relation with the measurement of rectified voltage VS across the storage elements, it may be provided to switch rectifying modes based on any other information or signal linked to this rectified voltage.

Of course, the present invention is likely to have various alterations, modifications, and improvements which will readily occur to those skilled in the art. In particular, the sizing of the storage elements, as well as the rectification mode switching threshold depend on the application and, in particular, on the frequency of the A.C. voltage source.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An apparatus, comprising:

a rectifier including first and second diodes;

a capacitor pair coupled to the rectifier, the capacitor pair including first and second series-connected capacitors; and a switch coupled to at least one of the first and second series-connected capacitors, the switch having a first state and a second state, wherein, in the first state, the rectifier operates in full-wave mode and wherein, in the second state, the rectifier operates in half-wave mode.

2. The apparatus of claim 1, wherein, in one of the first state and the second state, the switch is configured to short the at least one of the first and second series-connected capacitors and to short one of the first and second diodes.

3. The apparatus of claim 1, further comprising a comparator coupled to the switch, the comparator having a first input and a second input, the first input indicating a voltage of the capacitor pair and the second input being a voltage threshold.

4. The apparatus of claim 3, wherein the switch operates in the first state if the voltage of the capacitor pair is less than the voltage threshold and wherein the switch operates in the second state if the voltage of the capacitor pair is greater than the voltage threshold.

5. The apparatus of claim 1, further comprising a third diode connected in parallel to the switch.

6. The apparatus of claim 1, wherein the rectifier and the capacitor pair generate an output signal, the output signal having a first voltage and a first frequency when the switch is in the first state and the output signal having a second voltage and a second frequency when the switch is in the second state, the first voltage and the first frequency being different than the second voltage and the second frequency.

7. The apparatus of claim 6, wherein the second frequency is half the first frequency.

8. The apparatus of claim 6, wherein the second voltage is approximately half the first voltage.

9. A method, comprising:

charging a plurality of series-connected capacitors via a rectifier circuit; and changing operation of the rectifier circuit between a full-wave mode and a half-wave mode based at least in part on a voltage across the plurality of series-connected capacitors; and further comprising shorting at least one diode in the rectifier circuit and at least one capacitor of the plurality of series-connected capacitors to operate the rectifier in half-wave mode.

10. The method of claim 9, further comprising:

comparing the voltage across the series-connected capacitors to a threshold value;

generating a compare output in response to the comparing; and using the compare output to change the operation of the rectifier circuit.

* * * * *